M. PALMER.
MIDDLINGS SEPARATOR.

No. 176,885. Patented May 2, 1876.

Witnesses:
Donn P. Twitchell.
Will W. Dodge

Inventor:
Monroe Palmer,
by Dodge & Son,
Attys.

UNITED STATES PATENT OFFICE.

MONROE PALMER, OF HAMILTON, WISCONSIN.

IMPROVEMENT IN MIDDLINGS-SEPARATORS.

Specification forming part of Letters Patent No. 176,885, dated May 2, 1876; application filed April 19, 1876.

*To all whom it may concern:*

Be it known that I, MONROE PALMER, of Hamilton, in the county of La Crosse and State of Wisconsin, have invented certain Improvements in Middlings-Machines, of which the following is a specification:

My invention consists of a new construction of machine for purifying middlings, as hereinafter more fully described.

Figure 1:
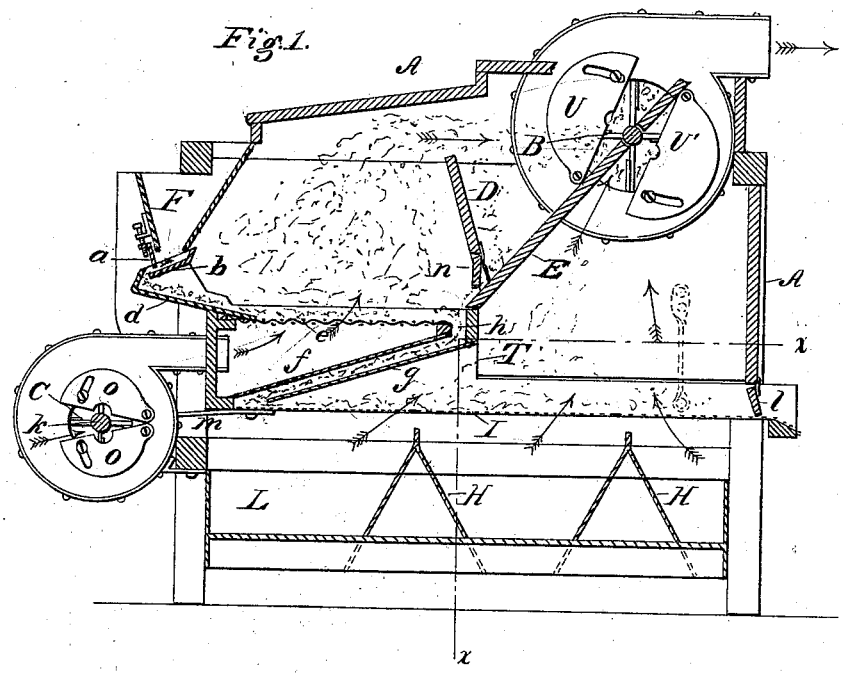
Figure 2:
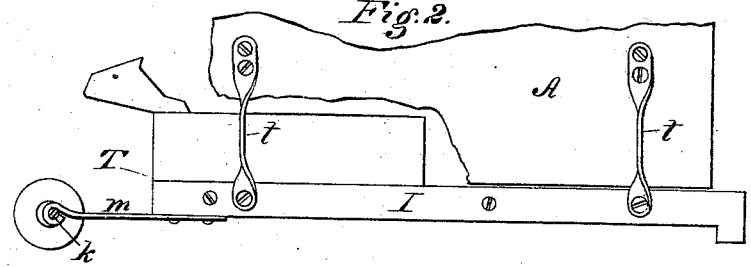
Figure 3:
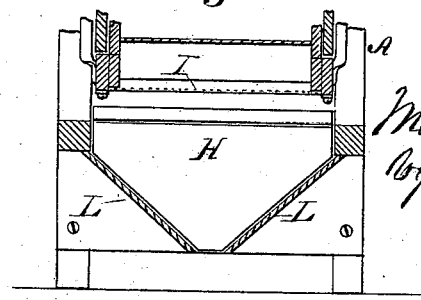

Figure 1 is a longitudinal vertical section. Fig. 2 is a side elevation of a portion, and Fig. 3 is a transverse vertical section on the line $x$ $x$ of Fig. 1.

To construct my improved machine, I mount in a suitable frame an air-tight case, A, as shown in Fig. 1. Underneath the case A I hang on suspension spring-rods $t$ a reciprocating frame, T, (shown more clearly in Fig. 2,) this frame having a raised portion at its front end, which extends nearly one-half its length, as shown. In this elevated or raised portion I arrange a sieve or screen, $e$, which may be made of wire-gauze, plain or rolled, perforated or slotted metal, or suitable material of any kind, and underneath the same secure an inclined metal plate or board, $f$, which extends from the rear end of the screen $e$ down to the front end of the frame T, as shown in Fig. 1, the screen $e$ and the plate $f$ stopping just short of the rear end of the elevated portion of the frame T, thereby leaving a throat or opening, $h$, for the passage of the material, as shown in Fig. 1. Underneath the plate $f$ I arrange another and similar inclined plate, $g$, which extends from the rear end to near the front, but which stops short of the front end, thus leaving an opening at its front end, as shown. In the lower portion of the frame T, and extending its entire length, I arrange another screen or sieve, I, which is preferably composed of bolting-cloth, arranged in transverse sections of different degrees of fineness.

At the front end of the upper screen $e$ I secure an inclined plate, $d$, which comes directly under a hopper, F, at the end, and outside of the case A, as shown in Fig. 1, there being at the front side of the hopper a slide, $a$, provided with set-screws for adjusting it so as to regulate the feeding of the material, as shown in Fig. 1.

At the front end of the machine I locate a fan, $c$, the mouth of the case of which fits, through an opening in the end of the reciprocating frame or shaker T, in such a manner as to deliver its blast above the inclined plate $f$ and under the screen $e$, as shown in Fig. 1. On this fan-shaft $k$ I mount two eccentrics or short cranks, which are connected, by straps or rods $m$, with the frame or shaker T, by which a quick short reciprocating movement is imparted to the latter, as shown in Fig. 2.

In the upper portion of the case A, near its rear end, I mount a second fan, B, the central openings of its case being within the case A, while its mouth or spout is outside of the same, as shown in Fig. 1. An inclined partition, E, extends from the rear end of the raised portion of the shaker T, up to the fan-case, and along the sides thereof, across the central openings of said fan-case, to the top of case A—this partition thus dividing the case A into two separate air-chambers, both of which communicate with the case of fan B. The fan-case B is provided at each side with two separate slides or valves, $v$ and $v'$, by which the admission of air from either chamber is regulated at will; the front fan $c$ being in like manner provided with slides or valves $o$ for regulating the admission of air into the front chamber. Another partition, D, is arranged, as shown in Fig. 1, in the front chamber, this partition D extending about two-thirds of the distance, more or less, up toward the top of the case A, thus leaving an open passage above it, within the case. At the bottom of this partition D a narrow transverse opening is left, in which is hung a loose valve, $n$, as shown in Fig. 1, the object of which will be hereinafter explained. Underneath the shaker T is arranged a receptacle, which has inclined sides L, as shown in Fig. 3, they extending the entire length of the machine, as shown in Fig. 1, and within this receptacle any desired number of movable separating or division plates, H, as shown in Figs. 1 and 2, are placed.

The operation of the machine is as follows: The material to be operated upon is placed in the hopper F, from whence it passes in a thin sheet gradually down upon the plate $b$, which delivers it upon the inclined plate $d$, attached to the front end of the shaker T, from whence it is worked gradually along over the screen e, through which a blast of air is forced by the fan c, as indicated by the arrows, at the front end of the machine. This air-blast, which thus passes through the perforations or meshes of the screen e, raises or lifts the material up from the screen, this operation being assisted by the partial vacuum created in the front chamber by the exhaust-fan B at rear. While the material is thus raised and agitated above the screen e, the dust and lighter portions thereof are drawn by the exhaust current over the top of the partition D, and into and out through the fan-case at the rear, the heavier portion or particles working off at the rear end of the screen e, through the passage h, and thence down between the inclined plates f and g, upon the front end of screen I, through which all the pure middlings pass into the receptacle below, it being graded as it passes over the different portions of this screen, which, as previously stated, is clothed with bolting-cloth or other screening material of various degrees of texture or fineness of mesh. By arranging the movable partitions H in the receptacle below, the different qualities of middlings may be kept separate, or may be mixed more or less, as may be desired.

Any of the heavier particles which may be carried up over the partition D, behind which there will be an eddy in the air-current, will drop down behind the partition, and whenever there has accumulated a sufficient quantity to press the hinged valve or gate n open, it will pass through into the throat h, and thence be carried down upon the screen I, the valve n closing again by gravity as soon as the material has passed. At the same time that this operation is taking place a current of air is being drawn by the exhaust-fan B up through the screen I and throug the rear chamber into the case of fan B, as indicated by the arrows in the rear chamber, this operation tending to assist the passage of whatever bran or similar material there may be along to the rear end of the screen I, and at the same time operating to suck up and separate from the middlings any light specks or dust that may chance to have escap d separation therefrom in the front chamber. It will thus be seen that the material is subjected to a double process of separation—first, in the front chamber, before reaching the screen I, and again in the rear chamber, while on the screen I—the first being by the combined operation of a force and suction blast and the latter that of a suction-blast only, in connection with a screening or sifting operation, and that by means of the valves on the two fan-cases the force of the force and suction blasts may each be regulated just as desired; and, further, that if desired, the blast or suction may be shut off from the rear chamber entirely without, in any manner, affecting that of the front chamber.

While I have spoken of the device e as a screen, it will be seen that it does not operate as a sieve to sift or screen the material, but merely as a support for the same, and to permit the air to pass up through it, thus lifting the material in its passage over it up into the vacuum or partial vacuum in the front chamber, thereby keeping it thoroughly agitated and securing a more perfect separation of the light from the heavier material. It will be seen that the blast or current of air which passes upward through this screen e, instead of being intermittent, as in many machines of this class, is continuous and steady, as is also that of the exhaust-fan B, and that thus the operation of the machine is constant and uniform.

A machine constructed on this plan I have found, by practical experiment and use, to give most satisfactory results. It is, moreover, cheap, simple, and durable.

Having thus described my invention, what I claim is—

1. A middlings-machine, constructed, substantially as described, with two air-chambers, in one of which the material is subjected to the action of a force and a suction blast, and in the other to a suction-blast only.

2. The partition D, located in the passage or chamber between the force and the suction fans, and provided with the hinged gate or valve n, arranged to operate substantially as described.

3. The exhaust-fan B, set in the partition E, with the openings of its case communicating direct with each chamber, and provided with the valves v and v', whereby the exhaust from each chamber can be increased or decreased at will, as set forth.

4. In a middlings-machine, an exhaust-fan, arranged to draw air continuously through the graded screen, and also through a separate screen, over which the material is fed before entering on the graded screen, as and for the purpose described.

5. The frame or shaker T, provided with the screen e, inclined plates f and g, and the screen I, all combined and arranged to operate substantially as described.

MONROE PALMER.

Witnesses:
P. T. DODGE,
W. O. DODGE.